(12) United States Patent
Kunze et al.

(10) Patent No.: US 7,987,080 B2
(45) Date of Patent: Jul. 26, 2011

(54) METHOD FOR OPERATING AN INDUSTRIAL SCALE INSTALLATION AND GUIDANCE SYSTEM FOR SAME

(75) Inventors: Ulrich Kunze, Bubenreuth (DE); Arno Römpke, Neunkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 300 days.

(21) Appl. No.: 12/311,385

(22) PCT Filed: Mar. 2, 2007

(86) PCT No.: PCT/EP2007/052012
§ 371 (c)(1),
(2), (4) Date: Mar. 26, 2009

(87) PCT Pub. No.: WO2008/040562
PCT Pub. Date: Apr. 10, 2008

(65) Prior Publication Data
US 2010/0023175 A1 Jan. 28, 2010

(30) Foreign Application Priority Data

Sep. 29, 2006 (EP) .................................. 06020612

(51) Int. Cl.
*G06G 7/48* (2006.01)
*G05B 19/042* (2006.01)
*G07C 3/00* (2006.01)

(52) U.S. Cl. ................ 703/7; 700/21; 700/117; 702/34; 702/184

(58) Field of Classification Search .................. 703/6, 7; 700/11, 21, 117; 702/33, 34, 182–185
See application file for complete search history.

(56) References Cited

U.S. PATENT DOCUMENTS

| 4,719,587 A * | 1/1988 | Berte .............................. 702/34 |
| 4,764,882 A * | 8/1988 | Braschel et al. ................ 702/42 |
| 5,311,562 A | 5/1994 | Palusamy et al. |
| 7,058,552 B2 * | 6/2006 | Stothert et al. .................... 703/2 |
| 7,328,625 B2 * | 2/2008 | Sundermeyer et al. ......... 73/806 |
| 7,426,456 B2 * | 9/2008 | Alvarez et al. .................... 703/2 |
| 7,487,066 B2 * | 2/2009 | Sundermeyer et al. ....... 702/182 |

(Continued)

FOREIGN PATENT DOCUMENTS

EP   1205830 A1   5/2002

OTHER PUBLICATIONS

Mukhopadhyay et al., On-Line Fatigue-Creep Monitoring System for High-Temperature Components of Power Plants, International Journal of Fatigue, vol. 23, Iss. 6, Jul. 2001, pp. 549-560.*

Park et al., Evaluation of an Energy-Based Approach and a Critical Plane Approach for Predicting Constant Amplitude Multiaxial Fatigue Life, International Journal of Fatigue, vol. 22, Iss. 1, Jan. 2000, pp. 23-39.*

(Continued)

*Primary Examiner* — Russell Frejd

(57) ABSTRACT

A method and a guidance system for operating an industrial scale installation, especially a power plant installation, are provided. For this method and guidance system a number of installation operating parameters characterizing the operating state of the installation and several component operating parameters of selected components of the installation are monitored and stored in a memory device. A characteristic fatigue value characterizing the current fatigue state of each component is determined, as required, using the stored installation operating parameters and/or the stored associated component operating parameters. The purpose of this method and guidance system is to develop an operation of the installation which protects resources. To this end, an associated fatigue prognosis value is determined from the characteristic fatigue value characterizing the current fatigue state for each selected component using guiding parameters characterizing a planned change of state.

19 Claims, 1 Drawing Sheet

U.S. PATENT DOCUMENTS

| | | | |
|---|---|---|---|
| 7,712,376 B2* | 5/2010 | Bode et al. ................... | 73/808 |
| 7,889,840 B2* | 2/2011 | Vasudevan et al. ............ | 378/58 |
| 2004/0030524 A1 | 2/2004 | Jarrell et al. | |
| 2008/0004839 A1* | 1/2008 | Papadimitriou et al. ...... | 702/182 |
| 2008/0004882 A1* | 1/2008 | Papadimitriou et al. ...... | 704/275 |

OTHER PUBLICATIONS

DIN EN 12952-4: Oct. 2001 "Water-tube boilers and auxiliary installations, Part 4: In service boiler life expectancy calculations, German version EN 12952-4: 20-00", pp. 1-18.

\* cited by examiner

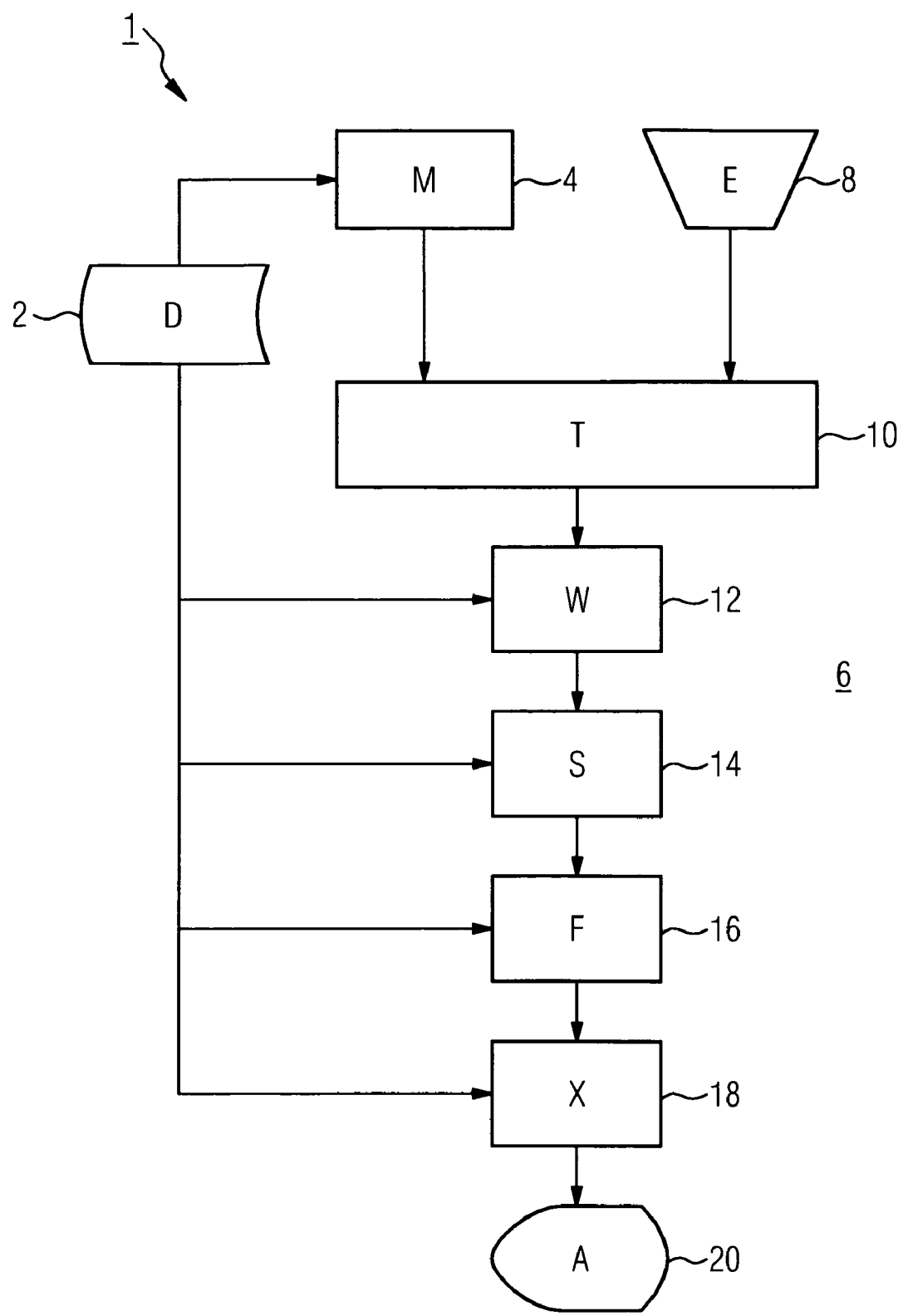

METHOD FOR OPERATING AN INDUSTRIAL SCALE INSTALLATION AND GUIDANCE SYSTEM FOR SAME

CROSS REFERENCE TO RELATED APPLICATIONS

This application is the U.S. National Stage of International Application No. PCT/EP2007/052012, filed Mar. 2, 2007 and claims the benefit thereof. The International Application claims the benefits of European Patent Office application No. 06020612.5 EP filed Sep. 29, 2006, both of the applications are incorporated by reference herein in their entirety.

FIELD OF INVENTION

The invention relates to a method for operating an industrial scale installation, in particular a power plant installation, in which a number of installation operating parameters characterizing the respective operating state of the technical installation and for a number of selected components of the technical installation respectively a number of component operating parameters of relevance for the respective component are monitored and stored in a storage facility, with a characteristic fatigue value characterizing the current fatigue state of the respective component being determined for the or each selected component as required on the basis of the stored installation operating parameters and/or the stored assigned component operating parameters. It also relates to a guidance system for an industrial scale installation, in particular a power plant installation, which is designed in an appropriate manner in respect of its components, for example storage facilities, evaluation units and the like, for the determination of fatigue values for the installation components and is thus suitable for implementing the cited method.

BACKGROUND OF INVENTION

Technical or industrial scale installations are found in the most diverse areas of industry, being used for example to manufacture a specific product, to further process or refine raw materials, to carry out previously manual activities in an automated manner or to produce in particular electrical energy. Finished industrial scale installations, such as power plant installations in particular, generally consist of a plurality of installation components, which realize the individual functions of the respective industrial scale installation. Many such installation components are subject to mechanical or operationally induced wear during their operating life. During the service life of the technical installation wear of the installation components represents an important aspect even as early as the design stage of the installation, as if a wear limit is exceeded, the function of the technical installation or at least of the affected components can no longer be insured.

In power plant installations in particular parts or installation components such as boilers, steam generators, collectors, conduits and the like are subjected to changing mechanical stresses due to changes in the parameters of their environments such as pressure and temperature for example. These different loadings, or load changes of the power plant installation, which are generally associated with a change of state of the power plant installation, for example an increase in or reduction of output, normally result in possibly considerable material strain in the affected component and to so-called part fatigue, which above a certain limit can also result in part failure. In particular such fatigue limits the operational life or maximum permissible operating life of the respective power plant component or installation component. For these reasons part fatigue of selected installation components is taken into account during the planning of an industrial scale installation and also during the planning of repair and maintenance cycles, in order to be able to insure replacement of the respective components as required in good time before part failure.

To take appropriate account of such fatigue phenomena during installation planning, during the construction or design of power plant parts, to insure a minimum service life, the respective components or parts are generally subjected to a predefined load spectrum consisting of a limited number of types of load change, for example comprising a predetermined number of hot starts, warm starts and cold starts each with predefined modes of operation of the power plant installation.

For these standardized types of load change the respective fatigue contributions in the affected components are then determined for each type of load change, with relatively complex computation methods, such as finite element calculations, generally being deployed. The respective installation components are then generally designed taking into account the results thus obtained such that the overall fatigue of the respective part or component determined for each type from the individual fatigue contributions and the number of load changes applied does not exceed a predetermined limit value for fatigue deemed still to be permissible.

SUMMARY OF INVENTION

However taking the material fatigue in the individual parts or components into account in this manner does not allow the actual component response to be predicted adequately. In particular the actual mode of operation of an industrial scale installation or in particular of a power plant installation is generally more flexible and variable than is assumed at the design stage, as the mode of operation of the power plant installation has to be adapted for example to current load requirements or the like. In order therefore to be able to take account of the fatigue actually occurring during maintenance and audit planning for power plant installations in an appropriate manner, the respective part fatigue of selected installation components is generally monitored in power plant installations or other industrial scale installations. Since the part fatigue cannot generally be measured directly in this process, corresponding characteristic pressure and temperature values for characterizing the respective ambient conditions of the respective component are generally measured and monitored, from which the changing stresses caused by pressure and temperature changes in the respective component are then calculated. The resulting actual values for the stresses in the components are then combined in load change cycles, with the level and number of the respective load changes being compared with known limit values. A characteristic value characterizing the fatigue of the respective part or component, a so-called characteristic fatigue value, is then determined as a result, which is able for example to specify a percentage of the service life of the part. It is possible with such concepts to determine the fatigue occurring hitherto for the selected power plant or installation components over their entire operational deployment and to take it into account during maintenance and audit planning. Corresponding concepts are noted for example in DIN EN 12952-4: 2001-10 "Water-tube boilers and auxiliary installations, Part 4: In-service boiler life expectancy calculations, German version EN 12952-4: 2000".

However during the operation of such industrial scale installations, such as power plant installations, it must on the one hand be ensured mandatorily for safety reasons that maintenance and optionally replacement of wearing components or parts or those affected by fatigue is/are in any case undertaken in good time before the breakdown or failure of the respective component. On the other hand however there is a need to undertake such maintenance or repair interventions in the industrial scale installation in particular in a demand actuated manner, to avoid unnecessary installation stoppage times and to insure a particularly economical mode of operation, so that parts are only actually replaced, when they only have a relatively short remaining service life. Also for particularly efficient and economical operation of the installation the mode of operation of the respective installation should be selected to protect resources so that wear and fatigue in components and parts is kept as low as possible.

The object of the invention is therefore to develop a method for operating an industrial scale installation of the above-mentioned type, in which characteristic fatigue values characterizing selected installation components are determined, in such a manner that a particularly long operational service life of individual parts or components is particularly favored whilst still complying with predetermined safety standards and a particularly demand-actuated audit and maintenance plan is enabled. A guidance system for an industrial scale installation that is particularly suitable for implementing the method is also to be specified.

According to the invention this object is achieved in respect of the method in that based on the characteristic fatigue value characterizing the current fatigue state an assigned predicted fatigue value is determined respectively for the or each selected component on the basis of guidance parameters characterizing a planned change of state.

The invention is based on the consideration that for a mode of operation of the industrial scale installation or power plant installation that in particular protects resources and therefore favors the service life of the components or parts used, the determined characteristic fatigue values should be extended actively beyond a simple part diagnosis to the mode of operation of the installation. To this end based on the determined actual value for the current fatigue of the respective component or part a predicted value for part fatigue should be produced in the manner of an extrapolation taking into account the planned mode of operation of the installation, this predicted value being able to be used for example as an auxiliary variable for determining the need for repair or maintenance interventions. Such state change here is in particular a load change of a power plant and can in particular be a shutdown or startup procedure for the power plant installation.

The operating parameters to be taken into account for determining the respective characteristic fatigue values that are provided here are preferably on the one hand component-specific operating parameters or component operating parameters, which advantageously comprise characteristic values for ambient pressure, ambient temperature and/or ambient humidity of the respective component or part. Alternatively or additionally relevant or characteristic operating parameters or installation parameters are advantageously captured and evaluated for the state of the industrial scale installation or power plant installation as a whole, these advantageously comprising characteristic values for an installation switching state and/or a target output. It is then possible from all these parameters to determine the pressure and temperature values acting locally on the respective component or part, which ultimately induce the mechanical stresses and therefore the resulting fatigue in the part.

In order in this process to be able to determine particularly reliable characteristic values for part fatigue, in a further advantageous embodiment component parameters characterizing the respective component are taken into account when determining the respective characteristic fatigue value and/or the respective predicted fatigue value. The component parameters provided for here are particularly advantageously material data, geometric dimensions and/or pressure and temperature measuring points of significance for fatigue calculation in the respective component.

The complexity of the underlying processes resulting in fatigue means that a closed calculation of precise characteristic values or parameters using available resources is generally not possible or not practical. In order however to be able to provide particularly reliable characteristic values or parameters using only limited computer capacities, trend curves for temperature and/or pressure values within the respective component are advantageously taken into account to determine the respective predicted fatigue value. The trend curves here are advantageously determined from a thermodynamic simulation of the installation, with stored empirical knowledge or retained empirical values possibly being used if required.

To keep determination and processing outlay particularly low and therefore to facilitate installation diagnosis and guidance in a particularly efficient manner, in an additional or alternative advantageous embodiment specific account is taken of the knowledge that the breakdown of components or parts due to wear or fatigue will generally occur primarily and exclusively in the component most affected by wear or fatigue. Taking into account the wear or fatigue state of the respective component in maintenance and repair planning can thus be particularly effective in that the corresponding evaluations can be concentrated on the component expected to be most affected by fatigue and wear. To enable this, this component or part having the highest determined predicted fatigue value of all the evaluated components is advantageously identified as the so-called "guide component" for primary consideration during the installation prediction. This predicted fatigue value of the guide component is advantageously used as a criterion for initiating repair or maintenance measures.

In one particularly advantageous embodiment the specific evaluation of the fatigue states of the parts or components is not used just for demand-actuated repair or maintenance planning but also for optimizing the mode of operation of the industrial scale installation to achieve an operating mode that in particular protects resources and extends service life. To this end various state or load change scenarios, with which it would be possible to continue to operate the installation in the near future, are advantageously analyzed in the manner of scenario planning based on the current installation state. For example based on the current actual state of a power plant installation it is possible to compare a relatively fast, short-term increase in output with a relatively slowly applied, continuous increase in output. Predicted fatigue values are then advantageously determined for such alternative state change proposals and compared with one another, this comparison being used to select the one of the possible state change or load change processes resulting in the smallest installation loading characterized by the lowest predicted fatigue value. The comparison of different possible state or load changes can take place here based on the predicted fatigue value of the respective guide component or even based on a set of predicted fatigue values for a number of affected components.

With regard to the guidance system for an industrial scale installation, in particular a power plant installation, with a storage facility in which a number of installation operating parameters characterizing the respective operating state of the technical installation and a number of component operating parameters of relevance for a number of selected components in the technical installation are stored, and which is connected on the data side to an evaluation unit, which is designed for the respective determination as required of a characteristic fatigue value characterizing the current fatigue state of the or each selected component based on the stored installation operating parameters and/or the stored assigned component operating parameters, the cited object is achieved in that the evaluation unit is designed to determine an assigned predicted fatigue value for the or each selected component based on the characteristic fatigue value characterizing the current fatigue state on the basis of guidance parameters characterizing a planned change of state.

For a particularly reliable and precise evaluation a thermodynamic model of the industrial scale installation or power plant installation is stored here in a storage unit and can be used to estimate temperature and pressure loadings in individual components or parts in a particularly reliable manner.

The advantages achieved with the invention consist in particular in that using the fatigue analysis to provide corresponding predicted values enables or particularly favors particularly demand-actuated maintenance and audit planning for the industrial scale installation. Also by specifically evaluating fatigue contributions or expected fatigue contributions in individual components or parts of the industrial scale installation it is possible to select the load changes or state changes, which allow a generally speaking particularly resource-protecting mode of operation of the installation in respect of externally predetermined basic conditions.

BRIEF DESCRIPTION OF THE DRAWINGS

An exemplary embodiment of the invention is described in more detail with reference to a drawing, in which the FIGURE shows a schematic diagram of a guidance system for an industrial scale installation, in particular a power plant installation.

DETAILED DESCRIPTION OF INVENTION

The schematically illustrated guidance system 1 here comprises a plurality of modules or components (not shown in detail here), as are in common and standard use in industrial scale installations and in particular in power plant installations. In particular the power plant installation is provided with a plurality of measuring points or sensors, by way of which the parameters of components and parts during operation are monitored and optionally archived. These sensors and measuring points include a plurality of sensors and measuring points by way of which the fatigue of individual components or parts of the power plant installation is monitored during operation.

To this end in addition to other components the guidance system 1 comprises a storage facility 2, which is designed specifically to archive and hold the measurement values and parameters determined in the context of fatigue monitoring. Stored in particular in the storage facility 2 are the component parameters for the components and parts selected as being particularly relevant for fatigue monitoring, with a specific set of parameters being assigned in particular to each relevant part or component, this set of parameters containing material data, geometric dimensions and the pressure and temperature points of significance for fatigue calculation in the respective component or positioning data for this purpose. The monitored measurement values are also stored in the storage facility 2 as required, with one the one hand a number of installation operating parameters characterizing the operating state of the power plant installation being stored, for example characteristic values for load state, target loads and the like. Further relevant component operating parameters for the selected components of the power plant installation are also stored, with continuous ambient conditions such as air pressure, air temperature, air humidity of the parts to be monitored and their temperatures and pressures also being stored in the manner of measurement value capturing. The measurement values M characterizing these are determined in a measurement value capturing unit 4, which for its part is connected on the data input side to the corresponding sensors, and stored on the storage facility 2 as required.

The measurement value capturing unit 4 however also transfers the determined data to an evaluation unit 6, in which characteristic fatigue values are determined as required for the respective parts or components. The evaluation unit 6 here is not only designed to determine a current actual state for the respective part fatigue but the evaluation unit 6 also determines an assigned predicted fatigue value for the or each selected component, which uses a planned state change, for example a load change process or the like, based on the current fatigue state of the respective component, to describe its expected fatigue state after the respective state change has been implemented.

In order to be able to make such a prediction for expected fatigue of the or each part, the guidance system 1 comprises an input unit 8, by way of which target parameters E characterizing the state change to be analyzed in each instance can be input. In particular when analyzing a load change the power plant output to be set and the time period available for achieving the planned output level are input.

The measurement value capturing unit 4 and the input unit 8 are connected on the data output side to a first simulation module 10 of the evaluation unit 6. In the first simulation module 10 the operating program for the power plant installation required to achieve the respective target parameters and a trend curve of the relevant process parameters, such as pressures, temperatures and throughputs for example, are first calculated beforehand from the measured ambient conditions and installation operating parameters as well as the target parameters input in the input unit 8 for the state or load change to be evaluated. During this process a thermodynamic simulation and/or a thermodynamic model of the power plant is taken into account, with the thermodynamic model being stored in the first simulation module 10. The result of the thermodynamic simulation in the first simulation module 10 here, in addition to other parameters, is in particular the trend curves for pressures and media temperatures in the parts or components to be monitored.

The results are transferred to a second simulation module 12, in which the trend curves for pressures and temperatures in the respective component or part are used to determine the trend curves for the internal wall and central wall temperatures for the parts to be monitored. This is done using construction and material parameters, which are held in the storage facility 2.

In a subsequent third simulation module 14 the temperatures and pressures determined in the parts or components are used to determine the stress curves in the walls of the parts, with component-specific parameters or data records stored in the storage facility 2 also being used as required.

In a subsequent fourth simulation module 16 the determined stress curves for each part or component to be monitored are used to determine an expected fatigue contribution for the state or load change to be analyzed. In a subsequent fifth simulation module 18 the part or component is finally determined, for which the sum of the current characteristic fatigue contribution, which is held in the storage facility 2, and the additional fatigue contribution determined in the preceding fourth simulation module 16 and due to the state or load change to be evaluated is greatest. This part or component is identified as the "guide component" and is used as the relevant part in subsequent evaluations. The predicted fatigue value of the guide component is considered to be an expected fatigue contribution for the installation as a whole and is output for example in an output unit 20 for further evaluation or to inform operating personnel.

If different types of predicted fatigue values are determined appropriately, it is thus possible to plan a maintenance or repair intervention in a particularly demand-actuated manner, in that the expected fatigue of the guide component is compared in an appropriate manner with the limit values that are permitted or deemed permissible. Additionally or alternatively a number of different types of state or load changes can be simulated in the manner of scenario planning, with the determined predicted fatigue values being used to select the load scenario resulting in the smallest additional loading of the parts so that it can be used for the further operation of the installation.F

The invention claimed is:

1. A method for operating an industrial scale installation, comprising:
    monitoring a component operating parameter for a component of the industrial scale installation;
    monitoring an installation operating parameter for an operating state of the industrial scale installation;
    storing the component operating parameter in a storage facility;
    storing the installation operating parameter in the storage facility;
    determining a characteristic fatigue value for a current fatigue state of the component using the installation operating parameter and/or the component operating parameter;
    determining a predicted fatigue value for the component using the characteristic fatigue value and a plurality of guidance parameters from a planned change of state of the installation;
    identifying a guide component as the component with the highest predicted fatigue value;
    determining the predicted fatigue value of the guide component for each of a plurality of planned state changes;
    selecting one of the planned state changes based on the predicted fatigue value; and
    initiating the selected planned state change.

2. The method as claimed in claim 1, wherein the industrial scale installation is a power plant installation.

3. The method as claimed in claim 1, wherein the component operating parameter includes at least one of the parameters selected from the group consisting of ambient pressure, ambient temperature and ambient humidity of the component.

4. The method as claimed in claim 3, wherein when determining the characteristic fatigue value and/or the predicted fatigue value each component operating parameter of the component is used.

5. The method as claimed in claim 4, wherein the component operating parameter includes at least one of the parameters selected from the group consisting of material data, a plurality of geometric dimensions of the component, a position data of a temperature measuring point for a fatigue calculation, and a pressure measuring point of relevance for a fatigue calculation.

6. The method as claimed in claim 1, wherein the installation operating parameter includes at least one of the parameters selected from the group consisting of an installation switching state and a target output.

7. The method as claimed in claim 1, wherein a plurality of trend curves for a temperature value and/or a pressure value of the component are used to determine the predicted fatigue value.

8. The method as claimed in claim 7, wherein the plurality of trend curves are determined from a thermodynamic simulation of the industrial scale installation.

9. The method as claimed in claim 1, wherein the predicted fatigue value of the guide component is used as a criterion for initiating a repair or a maintenance measure.

10. The method as claimed in claim 1,
    wherein a set of predicted fatigue values is determined respectively for a plurality of planned state changes, and
    wherein one of the state changes is selected and initiated based on the set of predicted fatigue values.

11. A guidance system for an industrial scale installation of a power plant installation, comprising:
    a storage facility;
    a component;
    a component operating parameter;
    an installation operating parameter; and
    an evaluation unit,
    wherein the installation operating parameter and the component operating parameter are stored in the storage facility, and
    wherein the storage facility is connected to the evaluation unit on a data side, and
    wherein the evaluation unit determines a predicted fatigue value for the component based on a characteristic fatigue value and a plurality of guidance parameters from a planned change of state of the installation, identifies a guide component as the component with the highest predicted fatigue value, and determines a guide component predicted fatigue value for a plurality of planned state changes.

12. A guidance system for an industrial scale installation of a power plant installation as claimed in claim 11, wherein the power plant installation is equipped with a plurality of measuring points and/or sensors that monitor each of the component operating parameters.

13. A guidance system for an industrial scale installation of a power plant installation as claimed in claim 11, further comprising a measurement value capturing unit which is connected on an input side to the measuring points and/or sensors and connected to the evaluation unit on an output side to which the measurement value capturing unit transfers the component operating parameter.

14. A guidance system for an industrial scale installation of a power plant installation as claimed in claim 11, wherein the component operating parameter includes at least one of the parameters selected from the group consisting of ambient pressure, ambient temperature and ambient humidity of the component.

15. A guidance system for an industrial scale installation of a power plant installation as claimed in claim 14, wherein when determining the characteristic fatigue value and/or the predicted fatigue value each component operating parameter of the component is used.

16. A guidance system for an industrial scale installation of a power plant installation as claimed in claim 15, wherein the component operating parameter includes at least one of the parameters selected from the group consisting of material data, a plurality of geometric dimensions of the component, a position data of a temperature measuring point for a fatigue calculation, and a pressure measuring point of relevance for a fatigue calculation.

17. A guidance system for an industrial scale installation of a power plant installation as claimed in claim 11, wherein the installation operating parameter includes at least one of the parameters selected from the group consisting of an installation switching state and a target output.

18. A guidance system for an industrial scale installation of a power plant installation as claimed in claim 11, wherein a plurality of trend curves for a temperature value and/or a pressure value of the component are used to determine the predicted fatigue value.

19. A guidance system for an industrial scale installation of a power plant installation as claimed in claim 18, wherein the plurality of trend curves are determined from a thermodynamic simulation of the industrial scale installation.

* * * * *